US006628437B1

(12) United States Patent
Ooki et al.

(10) Patent No.: US 6,628,437 B1
(45) Date of Patent: Sep. 30, 2003

(54) IMAGE READING APPARATUS

(75) Inventors: Hiroya Ooki, Tokyo (JP); Tetsuichiro Yamamoto, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/177,386

(22) Filed: Oct. 23, 1998

(30) Foreign Application Priority Data

Oct. 29, 1997 (JP) .............................................. 9-297366

(51) Int. Cl.$^7$ ................................................ H04N 1/46
(52) U.S. Cl. ...................................... 358/509; 358/507
(58) Field of Search ................................ 358/507, 509, 358/480, 448, 400

(56) References Cited

U.S. PATENT DOCUMENTS

| 4,767,193 A | 8/1988 | Ota et al. ................... 358/509 |
| 5,768,663 A | * 6/1998 | Lin ............................. 399/220 |
| 6,037,582 A | * 3/2000 | Youngers .................... 250/234 |

FOREIGN PATENT DOCUMENTS

| JP | 58-123661 | 8/1983 | ............ H04N/1/01 |
| JP | 61-224658 | 10/1986 | |
| JP | 5-292254 | 11/1993 | ............ F71S/3/100 |
| JP | 9-93398 | 4/1997 | ............ H04N/1/04 |
| TW | 275418 | 5/1996 | .................. 358/509 |

OTHER PUBLICATIONS

Korean Office Action, dated Sep. 27, 2000, with English language translation of Korean Examiner's comments.
Japanese Office Action, dated Mar. 21, 2000, with English language translation of Japanese Examiner's comments.

* cited by examiner

*Primary Examiner*—Jerome Grant, II
*Assistant Examiner*—Negussie Worku
(74) *Attorney, Agent, or Firm*—Whitham, Curtis & Christofferson, P.C.

(57) ABSTRACT

An image reading apparatus according to the present invention employs an optical system including a fluorescent lamp as a line light source for illumination of the image source. An image reader housing has an elongated window. The translucent lamp positioned within the housing has a light emitting tube. The light emitting tube includes a middle section that is elongated in a direction parallel to the window width with a length at least equal to the maximum extent of the window width. The light emitting tube includes two boundary sections between which the middle section extends. The two boundary sections have bent ends connected to the middle section at ends thereof, respectively.

12 Claims, 7 Drawing Sheets

FIG. 3
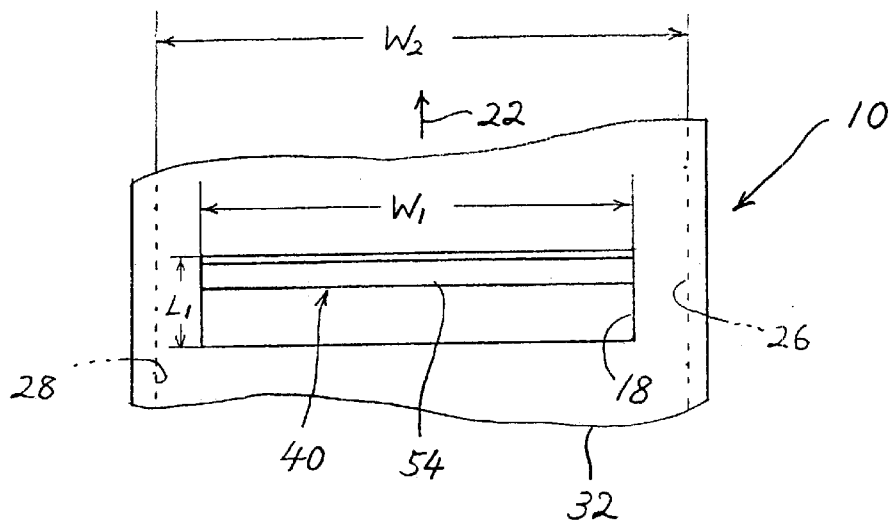
FIG. 4A
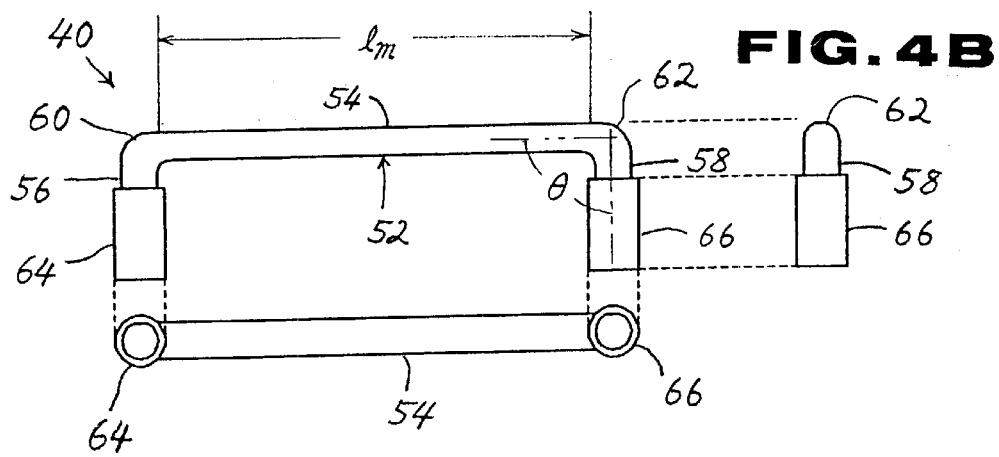
FIG. 4B
FIG. 4C

FIG. 7A
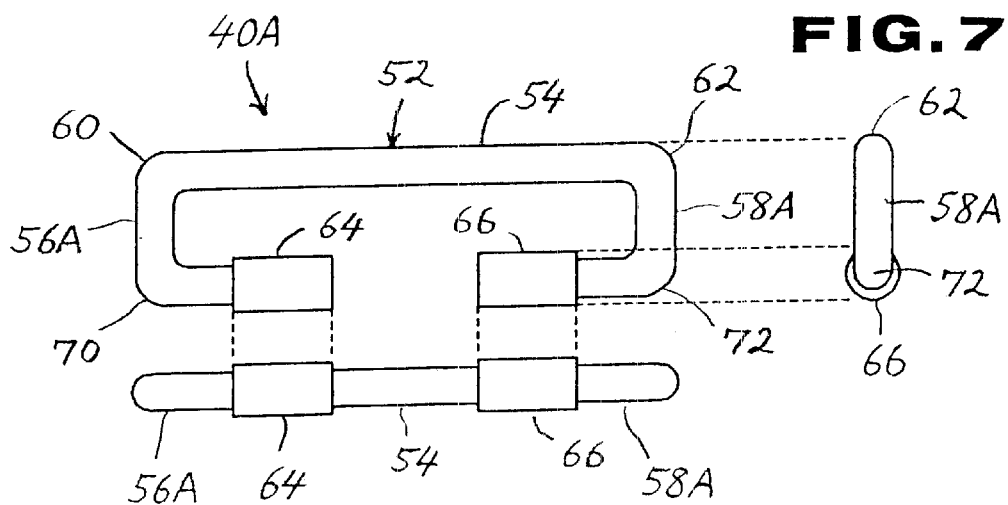
FIG. 7B
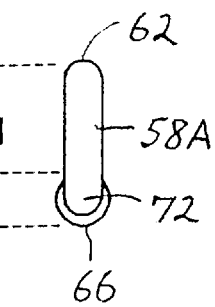
FIG. 7C
FIG. 8
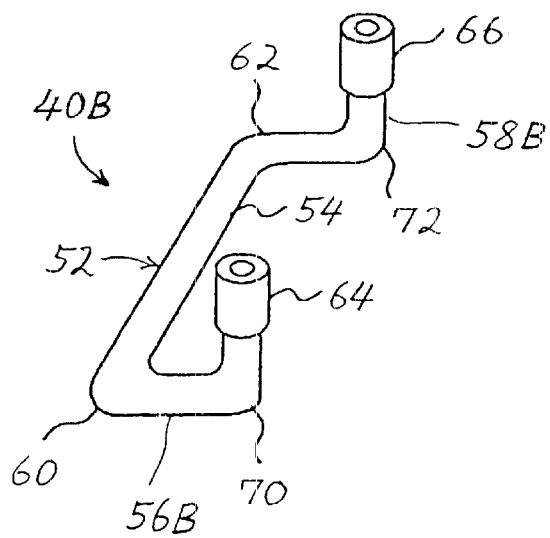

FIG.9A FIG.9B
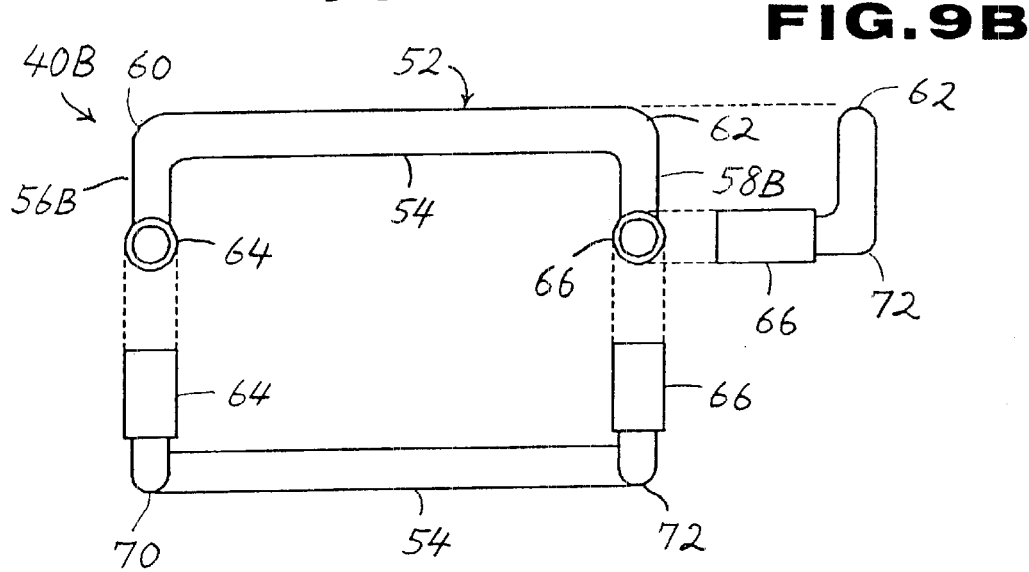
FIG.9C
FIG.10
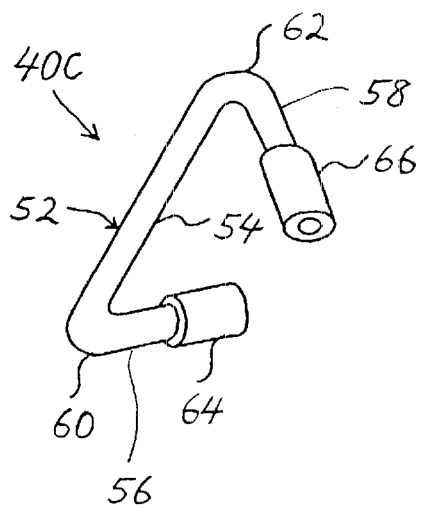

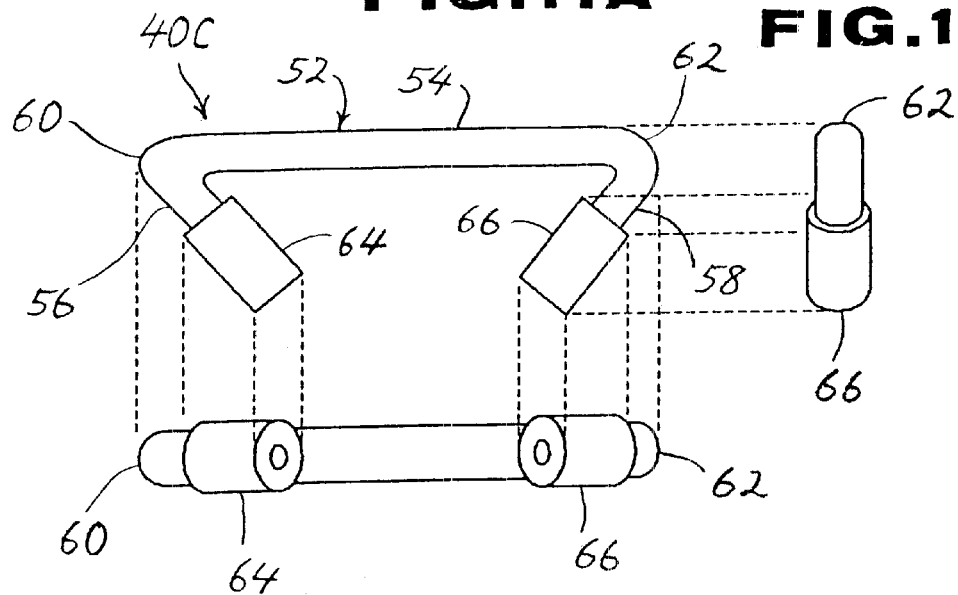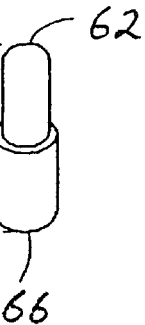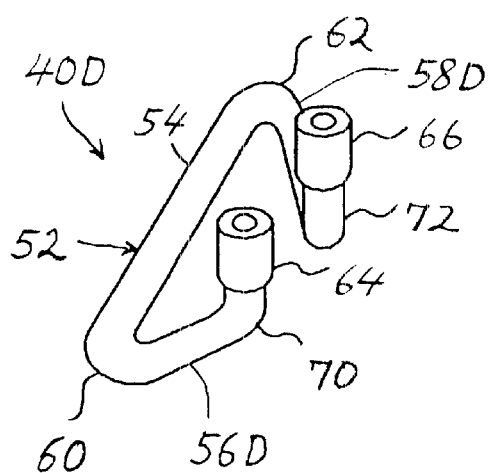

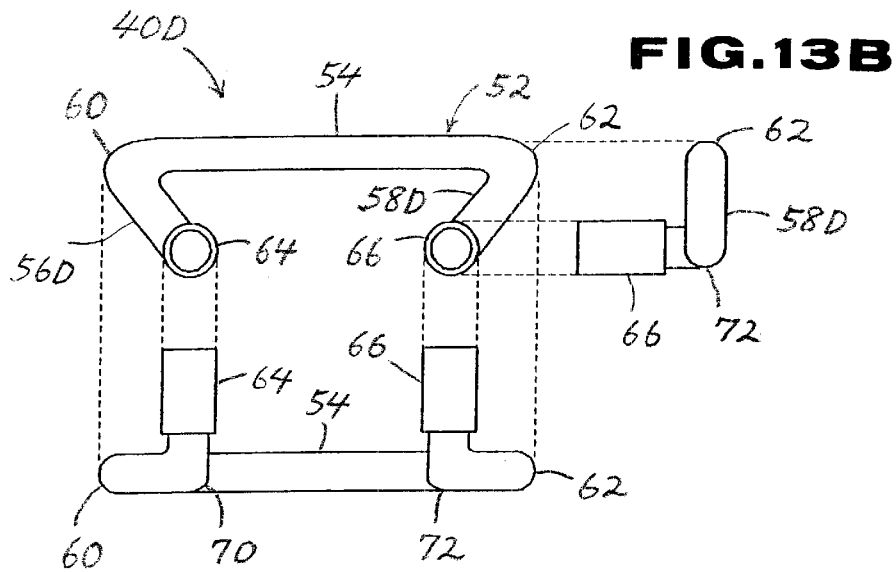
FIG. 13A
FIG. 13B
FIG. 13C
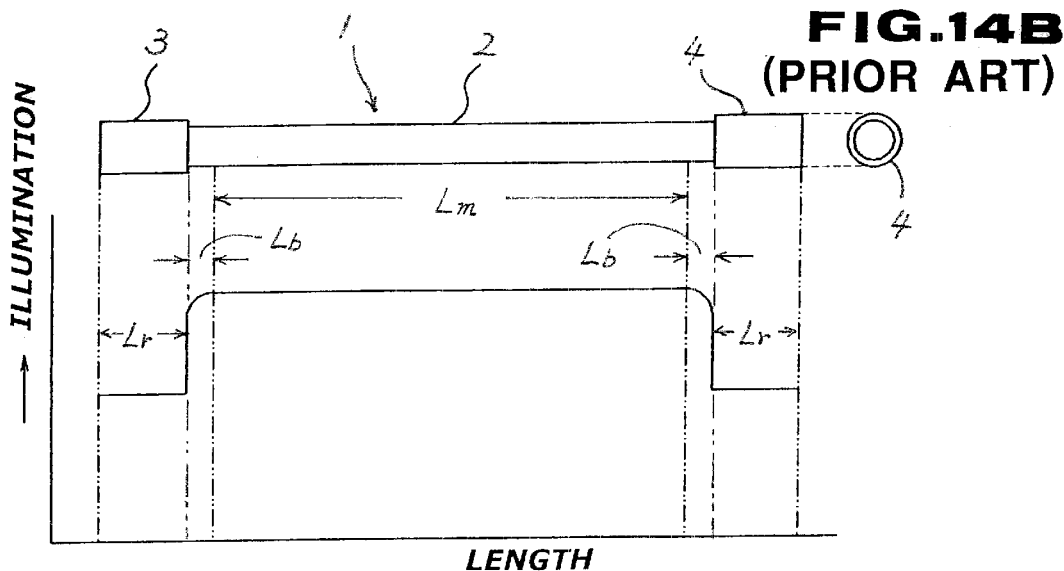
FIG. 14A (PRIOR ART)
FIG. 14B (PRIOR ART)
FIG. 15 (PRIOR ART)

IMAGE READING APPARATUS

FIELD OF THE INVENTION

The present invention relates to an image reading apparatus and more particularly to an image reading apparatus incorporating a line light source for illumination of the image source.

BACKGROUND OF THE INVENTION

An optical image reader or reading apparatus is conventionally constructed as an enclosed structure. Internal elements, such as a line light source, a rod lens and a light-receiving element, are enclosed in an internal space which is formed by a housing, a support plate and a window to the image source.

In many image scanning applications, the image source, such as a sheet of paper, is moved across the stationary platen of the image reader enclosure during scanning. In other image scanning applications, such as the use of hand-held scanners, the window of the enclosed image reader is manually moved across the stationary image source during scanning.

Image scanners have been developed, which employ charge coupled device (CCD) flat bed scanner technology that provides high image resolution. Using this technology, a line image having the length of a standard page is focused over a long focal length onto a remote image sensor or CCD sensor. Because of the long optical path, the image must be highly illuminated for sufficient resolution at the remote image sensor. Additionally, in order to make the long optical length more manageable, the optical path is typically "folded" within the system enclosure by way of optical configurations of mirrors and lenses.

It has been proposed to use an electric-discharge lamp such as a fluorescent lamp as a line light source for the image readers for low power consumption. A conventional fluorescent lamp includes a straight light emitting tube and two receptacles connected to the opposite ends of the light emitting tube, respectively. The light emitting tube may be divided into a middle section where luminescence is at a satisfactorily high level and two boundary sections where filaments are positioned and luminescence is low. The boundary sections define the opposite ends of the light emitting tube, respectively, and do not contribute to illumination of the image source. Thus, the middle section of the tube only contributes to illumination of the image source. The image reader is adapted to be moved in a first direction relative to the image source. The light emitting tube is elongated to extend across the window in a second direction that is orthogonal to the first direction. To highly illuminate the image at the edges of the window in the second direction, the middle section of the light emitting tube must be elongated to extend in the second direction with a length at least equal to a maximum extent of the window in the second direction. In this case, the boundary sections of the tube and the receptacles extend beyond the edges of the window in the second direction and a direction opposite to this second direction. A maximum extent of the housing of the image reader in the second direction is given after due consideration of not only the length of the middle section of the light emitting tube, but also the total length of the boundary sections and receptacles. Thus, a ratio of the maximum extent of the housing to the length of the middle section of the light emitting tube is not sufficiently small.

There remains a need for a compact image reading apparatus employing a fluorescent lamp as a line light source. More particularly, there remains a need for a fluorescent lamp appropriately constructed for making a great contribution to reduction of maximum extent of the housing in the second direction.

JP-A 58-123661 U proposes a fluorescent lamp to meet these needs to some extent. The fluorescent lamp according to this proposal has a straight fluorescent tube and two receptacles connected to the opposite ends of the tube. The receptacles have their projected electrodes elongated to extend in the first direction, while the tube and the receptacles are elongated to extend in the second direction. This fluorescent lamp has contributed to reduction of dimension in the second direction as compared to the case where the electrodes extend in the second direction and the opposite direction thereto. This reduction is not satisfactory, in amount, however.

An object of the present invention is to meet the above-mentioned needs at a satisfactorily high level.

SUMMARY OF THE INVENTION

According to one aspect of the invention, there is provided an image reading apparatus adapted to move in a first direction relative to a document, comprising:

a housing; and a translucent lamp positioned within said housing as a line light source for illumination of a document, said lamp having a light emitting tube, the light emitting tube including a middle section that is elongated in a second direction that is orthogonal to the first direction, the light emitting tube including two boundary sections between which the middle section extends, the boundary sections having bent ends connected to the middle section at ends thereof, respectively, the middle section and each of the boundary sections forming an angle, where the vertex of the angle is the adjacent bent end.

According to a specific aspect of the present invention, there is provided an image reading apparatus adapted to move in a first direction relative to a document, comprising:

a housing having a window that is elongated in a second direction that is orthogonal to the first direction;

a translucent lamp positioned within said housing as a line light source for illumination of a document through the window, said lamp having a light emitting tube, the light emitting tube including a middle section that is elongated in the second direction with a length at least equal to the maximum extent of the window, the light emitting tube including two boundary sections between which the middle section extends, the two boundary sections having bent ends connected to the middle section at ends thereof, respectively, the middle section and each of the bent ends forming an angle that is not greater than 90 degrees, where the vertex of the angle is the adjacent bent end, whereby a ratio of a maximum extent of said housing in the second direction to the maximum extent of the window is reduced.

BRIEF DESCRIPTION OF THE DRAWINGS

FIG. 3 is a bottom plan view of a portion the image reading apparatus to show a window.

FIGS. 4A, 4B and 4C are top plan, side and front elevation views of a first form of a translucent lamp, which is used as the line light source of the image reading apparatus.

FIGS. 7A, 7B and 7C are top plan, side and front elevation views of the second form of translucent lamp.

FIG. 8 is a perspective view of a third form of a translucent lamp that may be used as the line light source of the image reading apparatus.

FIGS. 9A, 9B and 9C are top plan, side and front elevation views of the third form of translucent lamp.

FIG. 10 is a perspective view of a fourth form of a translucent lamp that may be used as the line light source of the image reading apparatus.

FIGS. 11A, 11B and 11C are top plan, side and front elevation views of the fourth form of translucent lamp.

FIG. 12 is a perspective view of a fifth form of a translucent lamp that may be used as the line light source of the image reading apparatus.

FIGS. 13A, 13B and 13C are top plan, side and front elevation views of the fifth form of translucent lamp.

FIGS. 14A and 14B are top plan and side views of a conventional translucent lamp discussed before.

FIG. 15 is illumination (luminescence) vs., length characteristic curve of the conventional translucent lamp.

DESCRIPTION OF THE PREFERRED EMBODIMENTS

Before entering into the detailed description, a conventional fluorescent lamp discussed before is briefly explained in connection with FIGS. 14A, 14B and 15. The fluorescent lamp, generally designated at 1, includes a straight light emitting tube 2 and two receptacles 3 and 4. The receptacles 3 and 4 are connected to the opposite ends of the light emitting tube 2, respectively. The light emitting tube 2 may be divided into a middle section having a length Lm where luminescence is at a satisfactorily high level and two boundary sections, each having a length Lb, where filaments are positioned and luminescence is low. The boundary sections 3 and 4 define the opposite ends of the light emitting tube 2, respectively, and do not contribute to illuminations of the image source to the satisfactorily high level. Thus, the middle section of the tube only contributes to illumination of the image source. To highly illuminate the image facing the whole area of the window, the middle section of the light emitting tube 2 must be elongated to extend with a length at least equal to a maximum extent of the window. In this case, the boundary sections of the light emittng tube 2 and the receptacles lie outside of the window. A maximum extent of the housing of the image reader in the second direction is given after due consideration of not only the length Lm of the middle section, but also the total length 2(Lb+Lr) of the boundary sections and receptacles 3 and 4. Thus, a ratio of the maximum extent of the housing to the length Lm of the middle section of the light emitting tube 2 is not sufficiently small.

Figure 1:
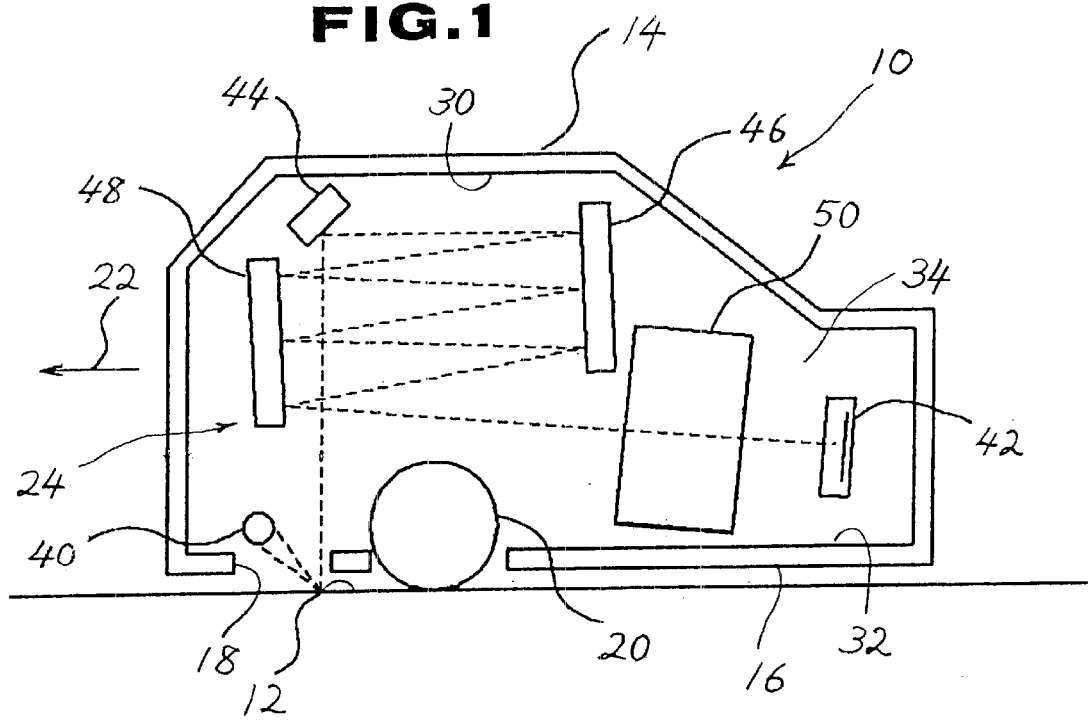
FIG. 1 is a side view of an image reading apparatus with unnecessary parts removed to show arrangement of internal elements, including a line light source, of an enclosure.
Figure 2:
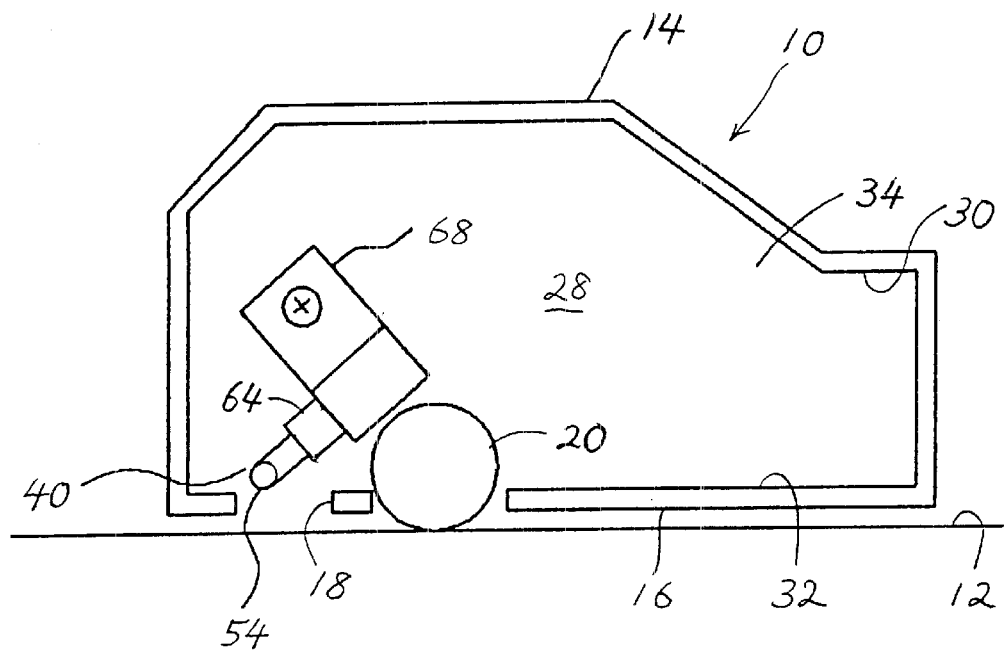
FIG. 2 is a view similar to FIGS. 1 with unnecessary parts removed to show a bracket to hold a translucent lamp.
Figure 5:
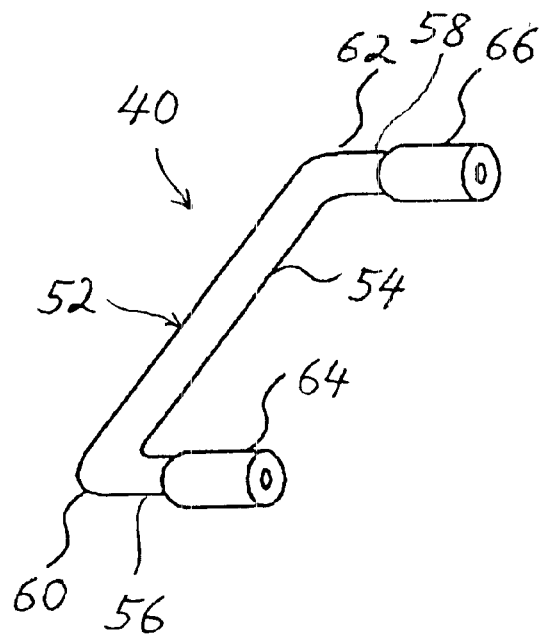
FIG. 5 is a perspective view of the translucent lamp.
Figure 6:
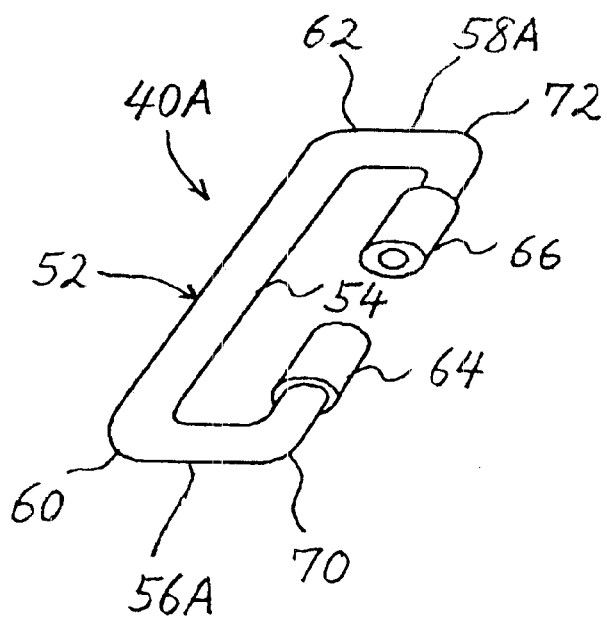
FIG. 6 is a perspective view of a second form of a translucent lamp that may be used as the line light source of the image reading apparatus.

Referring to the accompanying drawings, FIGS. 1 to 3 illustrate an image reading apparatus and FIGS. 4A to 5 illustrate the configuration of a fluorescent lamp. FIGS. 6 to 13C illustrate modifications of a fluorescent lamp. For ease of understanding of the fluorescent lamps, like reference numerals are used through out all of the FIGS. 1 to 13C.

The image reading apparatus, now designated at 10, is illustrated in FIGS. 1 to 3. As shown in FIG. 1, the image reading apparatus 10, which is on the image source in the form of a document 12, includes a housing 14 and a support plate 16 and a window 18. The support plate 16 has a drive gear including a roller 20 so that the image reading apparatus 10 is moved across the document 12 in a first direction as indicated by an arrow 22 during scanning.

In use, the window 18 faces the document 12. As shown in FIG. 3, the window 18 is rectangular, in shape, to allow a reading assembly 24 to cover a line image. The rectangular window has the dimensions of length $L_1$ and width $W_1$.

As shown in FIG. 3, the housing 14 has two parallel end walls 26 and 28 spaced by a width $W_2$, which is parallel to the window width $W_1$. As shown in FIGS. 1 and 2, a peripheral wall 30 extends over an inner wall 32 of the support plate 16 and interconnects the end walls 26, thereby defining an internal space or chamber 34 enclosing the reading assembly 24.

As shown in FIG. 1, the reading assembly 24 includes a line light source in the form of a translucent lamp 40, a CCD sensor or camera 42 and an optical system that includes mirrors 44, 46 and 48 and a lens unit 50. The line light source 40 is elongated in a second direction parallel to the window width $W_1$, as shown in FIG. 3, to allow for document reading along the window width $W_1$. The second direction is orthogonal to the first direction 22.

The translucent lamp 40, as shown in FIGS. 4A to 4C and 5, of the reading assembly 24 is positioned appropriately for illumination of document 12 through the window 18. The translucent lamp 40 has a light emitting tube 52. The light emitting tube 52 includes a straight middle section 54 that is elongated in the second direction parallel to the window width $W_1$ with a length $I_m$ at least equal to the maximum extent of the window 18. In this embodiment, the length $I_m$ is equal to the window width $W_1$.

The light emitting tube 52 includes two boundary sections 56 and 58 between which the middle section 54 extends. The two boundary sections 56 and 58 having bent ends 60 and 62 connected to the middle section 54 at ends thereof, respectively. The middle section 54 and each of the bent ends 60 and 62 forms an angle θ (theta) that is not greater than 90 degrees, where the vertex of the angle θ is the adjacent one of the bent ends 60 and 62. Each of the bent ends 60 and 62 define an outer corner surface and an inner corner surface.

The boundary sections 56 and 58 have the other ends, respectively, which are opposite to the bent ends 60 and 62. The translucent lamp 40 has receptacles 64 and 66. The receptacles 64 and 66 are connected or coupled to the boundary sections 56 and 58 at the other ends thereof, respectively. The receptacles 64 and 66 are used for connection to a power source.

The receptacles 64 and 66 are inclined upwardly, viewing in FIG. 2, and rearwardly, with respect to the forward movement in the first direction, and fixedly held by mount brackets, only one being shown at 68, to the adjacent end walls 28 and 26, respectively.

From the preceding description, it is to be understood that the use of the fluorescent lamp 40 has reduced a ratio of a maximum extent $W_2$ of the housing 14 in the second direction to the maximum extent $W_1$ of the window 18 and provides low-power illumination system. The reduction in this ratio allows the image reading apparatus 10 to be designed and constructed to be compact.

In the preferred embodiment described above, the boundary sections 56 and 58 are straight at intermediate portions between the bent ends 60 and 62 and the other ends thereof, which the receptacles 64 and 66 are fixedly coupled. The design and the configuration of the florescent lamp 40 which may be used as line light source of the image reading apparatus 10 is not limited to the specific example illustrated in FIGS. 4A to 5.

FIGS. 6, 7A, 7B, and 7C illustrate the second form of fluorescent lamp 40A. This lamp 40A is substantially the same as the lamp 40. However, the former is different from the latter in that two boundary sections 56A and 58A are bent at intermediate portions 70 and 72 between bent ends 60 and 62 and the other ends thereof. The intermediate portions 70 and 72 are bent such that the other ends of the boundary sections 56A and 58A and receptacles 64 and 66 line in parallel relation to a middle section 54.

FIGS. 8, 9A, 9B, and 9C illustrate the third form of fluorescent lamp 40B. This lamp 40B is substantially the same as the lamp 40. However, the former is different from the latter in that two boundary sections 56B and 58B are bent at intermediate portions 70 and 72 between bent ends 60 and 62 and the other ends thereof. The intermediate portions 70 and 72 are bent such that the other ends of the boundary sections 56B and 58B and receptacles 64 and 66 extend in a direction normal to a common plane in which a middle section 54 and bent ends 60 and 62 lie.

FIGS. 10, 11A, 11B, and 11C illustrate the fourth form of fluorescent lamp 40C. This lamp 40C is substantially the same as the lamp 40. However, the former is different from the latter in that the angle θ (theta) is less than 90 degrees.

FIGS. 12, 13A, 13B, and 13C illustrate the fifth form of fluorescent lamp 40D. This lamp 40B is substantially the same as the lamp 40. However, the former is different from the latter in that two boundary sections 56C and 58C are bent at intermediate portions 70 and 72 between bent ends 60 and 62 and the other ends thereof. The intermediate portions 70 and 72 are bent such that the other ends of the boundary sections 56C and 58C and receptacles 64 and 66 extend in a direction normal to a common plane in which a middle section 54 and bent ends 60 and 62 lie.

It is to be noted that while the invention has been described above with respect to specific preferred embodiments, the description is intended to illustrate and not to limit the scope of the invention, which is defined by the scope of the appended claims.

What is claimed is:

1. An image reading apparatus adapted to move in a first direction relative to a document, comprising:

a housing, having two parallel end walls spaced by a width $W_2$ and having a rectangular window that is elongated in a second direction that is orthogonal to the first direction; wherein the window has dimensions $L_1$ and $W_1$;

a translucent lamp positioned within said housing in parallel to said window width $W_1$ as a line light source for illumination of a document through the window, said lamp having receptacles, said lamp having a light emitting tube, the light emitting tube including a middle section that is elongated in the second direction with a length $l_m$ at least equal to the maximum extent of the window $W_1$, the light emitting tube including two boundary sections $L_b$ between which the middle section extends, and two receptacle sections Lr on the opposite sides of the said tube, the two boundary sections having bent ends connected to the middle section at ends thereof, respectively, the boundary sections having other ends, respectively, opposing the bent ends, the middle section and each of the bent ends forming an angle, wherein each of the boundary sections is bent at an intermediate portion between the bent end thereof and the other end thereof such that the other ends of the boundary sections and the receptacles extend in a direction normal to a common plane in which the middle section and the bent ends of the boundary sections lie, whereby the maximum extent $W_2$ of said housing in the second direction is reduced to at least 2(Lb+Lr) and a low-power illumination compact system is provided.

2. The image reading apparatus as claimed in claim 1 a maximum extent of said lamp in the second direction in excess of the length of the middle section is reduced, thereby reducing a ratio of a maximum extent of a said housing in the second direction to the length of the middle section.

3. The image reading apparatus as claimed in claim 1, wherein the angle is not greater than 90 degrees.

4. The image reading apparatus as claimed in claim 1, wherein the angle is less than 90 degree.

5. An image reading apparatus according to claim 1, wherein the middle section and each of the bent ends form an angle that is not greater than 90 degrees, where the vertex of the angle is the adjacent bent end.

6. The image reading apparatus as claimed in claim 1, wherein the angle is not greater than 90 degree.

7. The image reading apparatus as claimed in claim 6, wherein the middle section and each of the bent ends forming the angle that is not great than 90 degrees, where the vertex of the angle is the adjacent bent end.

8. The image reading apparatus as claimed in claim 6, wherein the angle is less than 90 degrees.

9. The image reading apparatus of claim 1, including two receptacles for connection to a power source.

10. The image reading apparatus of claim 1, including two receptacles for connection to a power source.

11. The image reading apparatus of claim 1, including two fixedly-coupled receptacles.

12. The image reading apparatus of claim 1, including two fixedly-coupled receptacles.

* * * * *

UNITED STATES PATENT AND TRADEMARK OFFICE
CERTIFICATE OF CORRECTION

PATENT NO.     : 6,628,437 B1
DATED          : September 30, 2003
INVENTOR(S)    : H. Ooki and T. Yamamoto It is certified that error appears in the above-identified patent and that said Letters Patent is hereby corrected as shown below:

Column 6,
Line 32, delete "claim 1" and insert -- claim 2 --.
Lines 35 and 41, delete "degree" and insert -- degrees --.
Lines 49 and 53, delete "claim 1" and insert -- claim 5 --.

Signed and Sealed this

Twenty-seventh Day of April, 2004

JON W. DUDAS
*Acting Director of the United States Patent and Trademark Office*